US012615569B2

(12) United States Patent
Khalid et al.

(10) Patent No.: US 12,615,569 B2
(45) Date of Patent: Apr. 28, 2026

(54) PREEMPTIVE MOBILE DEVICE HANDOFF DUE TO GRANT SUSPENSION IN A CITIZENS BROADBAND RADIO SERVICE (CBRS) NETWORK

(71) Applicant: Charter Communications Operating, LLC, St. Louis, MO (US)

(72) Inventors: Saran Khalid, Denver, CO (US); MohammedYusuf M. Shaikh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 325 days.

(21) Appl. No.: 18/439,858

(22) Filed: Feb. 13, 2024

(65) Prior Publication Data

US 2025/0261071 A1     Aug. 14, 2025

(51) Int. Cl.
| | |
|---|---|
| *H04W 36/22* | (2009.01) |
| *H04W 36/00* | (2009.01) |
| *H04W 36/08* | (2009.01) |
| *H04W 84/04* | (2009.01) |

(52) U.S. Cl.
CPC ..... *H04W 36/22* (2013.01); *H04W 36/00835* (2018.08); *H04W 36/08* (2013.01); *H04W 84/04* (2013.01)

(58) Field of Classification Search
None
See application file for complete search history.

(56) References Cited

U.S. PATENT DOCUMENTS

| | | | | |
|---|---|---|---|---|
| 10,980,025 | B2 | 4/2021 | Hmimy et al. | |
| 11,399,290 | B2 | 7/2022 | Mahalingam et al. | |
| 2019/0132776 | A1* | 5/2019 | Markwart | ............. H04W 36/16 |
| 2019/0364565 | A1 | 11/2019 | Hmimy et al. | |
| 2020/0106577 | A1* | 4/2020 | Chen | ...................... H04W 72/23 |

* cited by examiner

*Primary Examiner* — Christopher T Wyllie
(74) *Attorney, Agent, or Firm* — Young Basile Hanlon & MacFarlane, P.C.

(57) ABSTRACT

Methods and systems for preemptive handoff in response to receiving a grant suspension at a Citizens Broadband Radio Service (CBRS) device (CBSD). A traffic distribution system (TDS) maintains a base station list with a wireless coverage area. An operations support system receives a CBRS spectrum suspension command for a CBSD. In response to the CBRS spectrum suspension command, the TDS requests from a core network (CN), data for the mobile device and data for one or more neighbor base stations selected from the list based on the suspended CBSD and the mobile device data. The TDS determines an alternative base station for the mobile device, which is selected from the one or more neighbor base stations based on the data for the mobile device data and the one or more neighbor base stations, and sends to the CN, the alternative base station to initiate a handover command.

20 Claims, 10 Drawing Sheets

9000

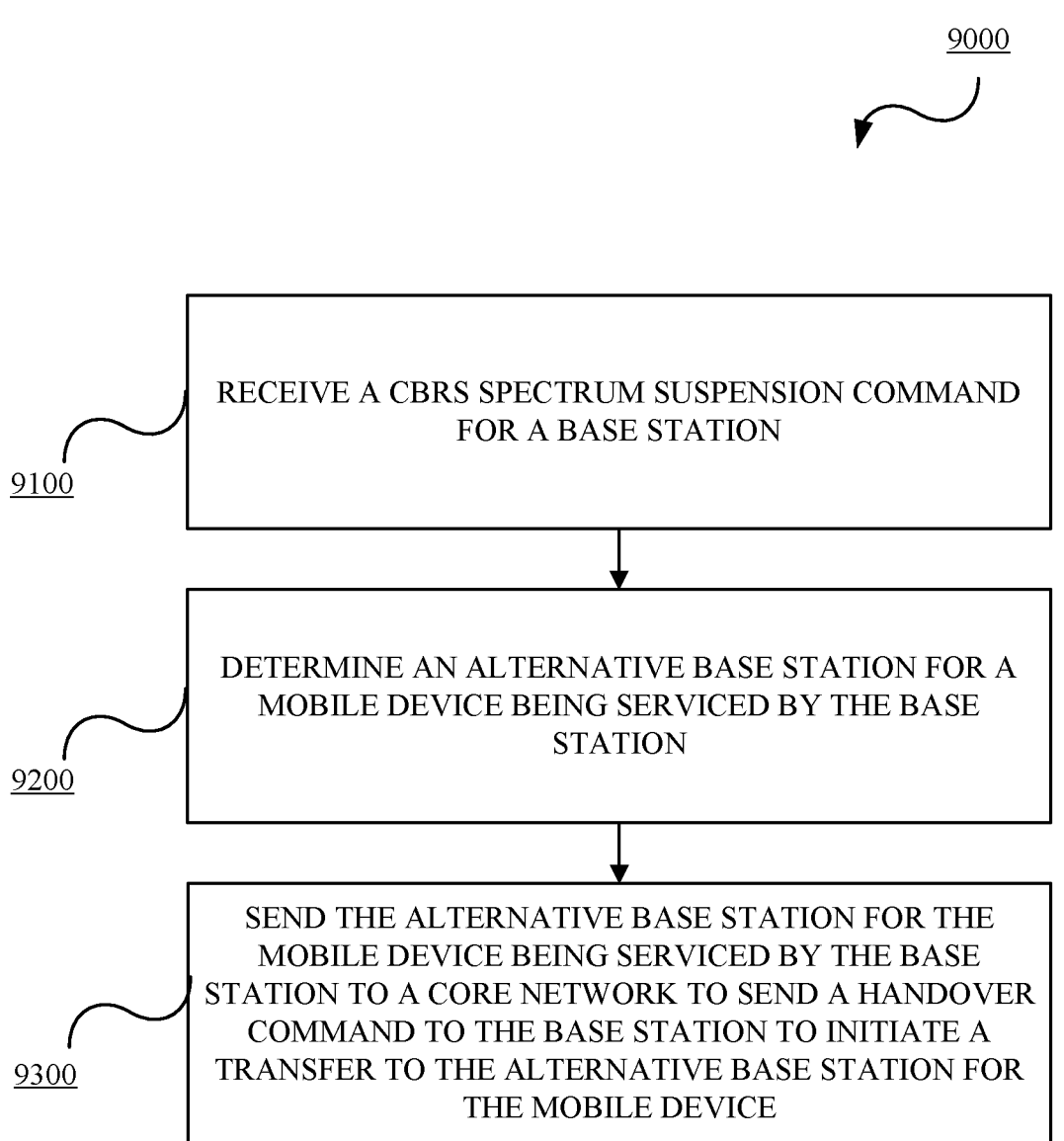

9000

RECEIVE A CBRS SPECTRUM SUSPENSION COMMAND
FOR A BASE STATION

9100

DETERMINE AN ALTERNATIVE BASE STATION FOR A
MOBILE DEVICE BEING SERVICED BY THE BASE
STATION

9200

SEND THE ALTERNATIVE BASE STATION FOR THE
MOBILE DEVICE BEING SERVICED BY THE BASE
STATION TO A CORE NETWORK TO SEND A HANDOVER
COMMAND TO THE BASE STATION TO INITIATE A
TRANSFER TO THE ALTERNATIVE BASE STATION FOR
THE MOBILE DEVICE

PREEMPTIVE MOBILE DEVICE HANDOFF DUE TO GRANT SUSPENSION IN A CITIZENS BROADBAND RADIO SERVICE (CBRS) NETWORK

TECHNICAL FIELD

This disclosure relates to wireless communications. More specifically, handing off a mobile device from a suspended Citizens Broadband Radio Service (CBRS) cell to another cell prior to losing service.

BACKGROUND

Wireless telecommunications or radio access technologies (RATs) generally use licensed radio frequency spectrum for communications between mobile devices and wireless telecommunications networks. For example, licensed spectrum is used for third generation (3G), fourth generation (4G), and fifth generation (5G) wireless communications. Wireless telecommunications technologies may also use unlicensed spectrum.

Citizens Broadband Radio Service (CBRS) spectrum is a type of unlicensed spectrum or shared radio frequency spectrum which is shared between multiple entities including government users (such as the military), licensed users, and non-licensed users. CBRS is a multitiered wireless band between 3.550 MHz and 3.700 MHz. In particular, CBRS is a three-tiered access framework including incumbent users (i.e., federal, military, and the like), priority access users (winning auction bidders) who have Priority Access Licenses (PALs) to CBRS spectrum, and general authorized access (GAA) users, where the general users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using a centralized spectrum access system (SAS), which may be a federal or commercial entity. The SAS authorizes or grants spectrum to access points known as CBRS Devices (CBSDs) and performs interference management to protect higher tier users. This protection may include, for example, dropping CBSDs which are general authorized access users. In summary, CBRS is an interference limited network which means that the performance of the network and the data sent to CBRS subscribers is limited by the amount of interference the CBRS users or subscribers experience in the frequency band of operation.

From the perspective of an end user or service provider, usage by higher tier users and/or incumbents may seem relatively random. However, protection of the higher tier users and/or incumbents may result in service outages at a cell level, cluster level, and/or network level. The SAS suspends grant(s) at CBSD(s) when there is higher tier and/or incumbent usage on the CBRS spectrum being used at the CBSD(s). The CBSD(s) radios stop transmissions in response to receiving the grant suspension. The mobile devices using the CBSD(s) may lose service completely when the CBSD(s) and/or associated cell goes out of service due to the grant suspension. In general, the SAS provides a defined amount of time before the CBSD(s) has to completely terminate communications. For instance, the defined amount of time may be 1 minute. That is, the CBSD(s) radios must move to a different channel and/or cell or stop radio transmissions within the defined amount of time.

Upon receipt of the grant suspension, a service provider or operations support system (OSS) may, in coordination with a core network, attempt to change the channel and/or cell or stop radio transmissions. This process can lead to the mobile device being out of service. In this instance, the mobile device has to start the random access channel (RACH) process to find another CBSD and/or a base station to attach to. Accordingly, there is a need for a method and system which can handover a mobile device from a suspended cell to another cell without losing service and without the need to initiate the RACH process.

SUMMARY

Disclosed herein is a system and method for preemptive handoff from a suspended Citizens Broadband Radio Service (CBRS) device (CBSD) to another base station. In an implementation, a method for preemptive handoff in a wireless network using Citizens Broadband Radio Service (CBRS) spectrum includes maintaining, by a traffic distribution system, a list of base stations, wherein each base station has a wireless coverage area, receiving, by an operations support system, a CBRS spectrum grant suspension command for a base station, in response to the CBRS spectrum grant suspension command, requesting, by the traffic distribution system from a core network, data for a mobile device being serviced by a suspended base station, requesting, by the traffic distribution system from a core network, data for one or more neighbor base stations, wherein the one or more neighbor base stations are selected from the list of base stations based on the suspended base station and the data received for the mobile device, determining, by the traffic distribution system, an alternative base station for the mobile device, wherein the alternative base station is selected from the one or more neighbor base stations based on the data received for the mobile device and the data received for the one or more neighbor base stations, and sending, by the traffic distribution system to the core network, the alternative base station to initiate a handover command for the mobile device from the suspended base station to the alternative base station.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 9 is a flowchart of an example method for preemptive handoff in accordance with embodiments of this disclosure.

DETAILED DESCRIPTION

Figure 1:
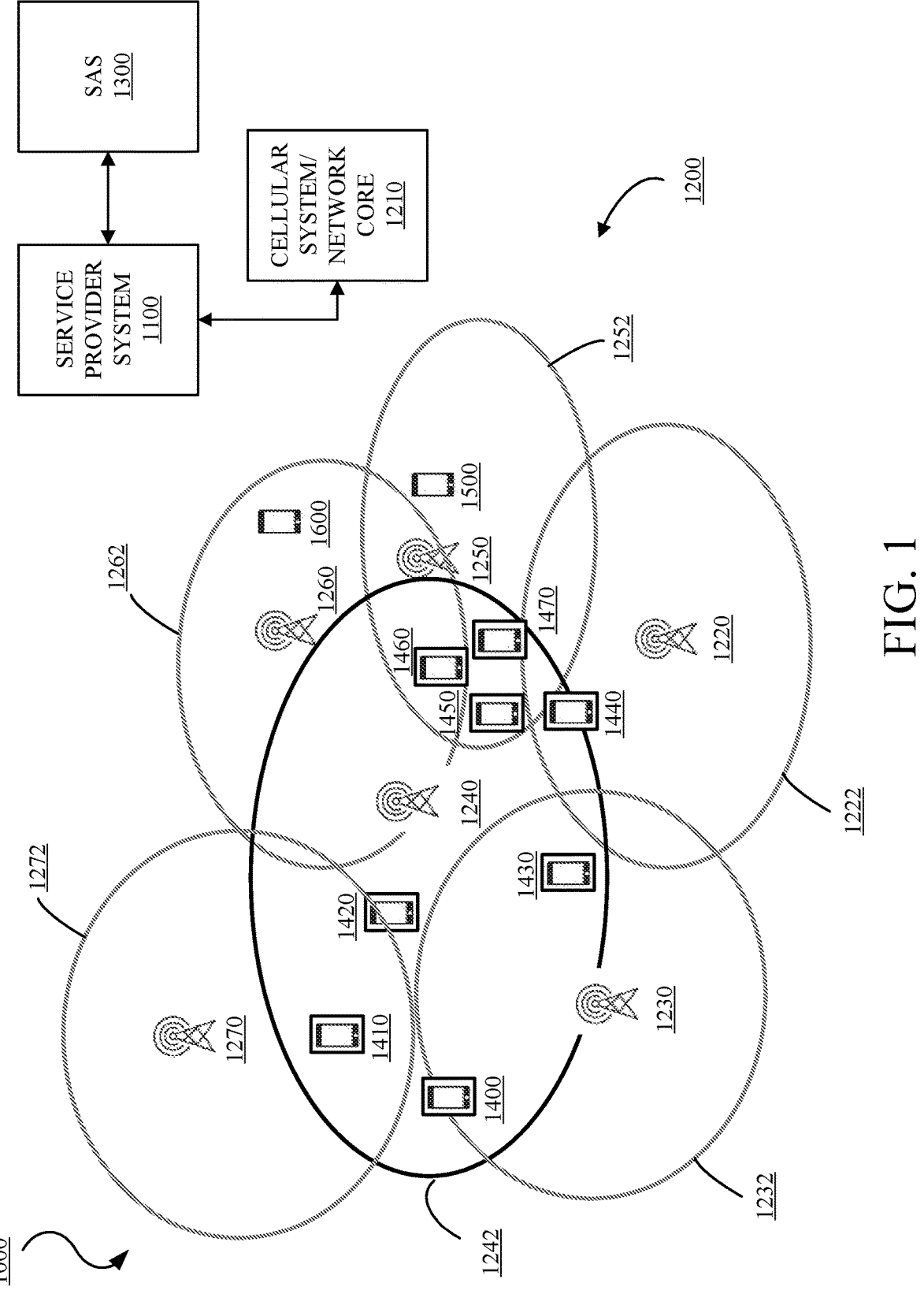
FIG. 1 is a diagram of an example of a wireless network architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU) s, one or more graphics processing units (GPU) s, one or more digital signal processors (DSP) s, one or more application specific integrated circuits (ASIC) s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein is a system and method for preemptive handoff in response to receiving a grant suspension at a Citizens Broadband Radio Service (CBRS) device (CBSD) in a CBRS network. In implementations, an operations support system (OSS) and traffic distribution system in the service provider system can collectively or cooperatively provide, to a core network, an alternative cell and/or network in the event of the CBSD grant suspension. This is provided for each mobile device that was being serviced by the suspended CBSD. In implementations, the traffic distribution system can be integrated with the OSS. The alterative cell and/or network can be provided before mobile devices using the suspended CBSD lose or have an interruption in service. For instance, the alternative cell can be provided before a mobile device has to undergo a random access channel or reattachment process.

In implementations, the traffic distribution system maintains a list of base stations, CBSDs or cells in the CBRS network, and/or combinations thereof (collectively "base stations"). In implementations, the base stations may be a node B, an evolved node B (eNodeB), a next generation node B (gNodeB), and/or variations thereof. In implementations, the base stations can support CBRS in addition to other services and/or networks. The traffic distribution system can use a propagation engine and propagation data to determine cell coverages for each base station. The cell coverages are used to determine alternative base stations, CBSDs, cells, and/or networks in the event a CBSD is suspended or out of service as a result of a SAS suspension. For instance, the SAS can suspend the grant due to incumbent activity, the SAS can blacklist the CBSD, de-registration of the CBSD, an administrative reason, and/or other reasons.

In implementations, the traffic distribution system can use the location of the mobile device, the location of the alternative cells, radio frequency (RF) conditions, and/or other information to select among multiple alternative cells in the event of a CBSD grant suspension.

In implementations, the traffic distribution system can use load conditions with respect to the mobile device, load conditions with respect to the alternative cells, and/or combinations thereof to complement or supplement selection of the alternative cell. This enables load distribution among multiple alternative cells in the event of a CBSD grant suspension. In implementations, the load conditions with respect to the mobile device, the load conditions with respect to the alternative cells, and/or combinations thereof can be obtained in real-time or substantially real-time to make optimal selections.

FIG. 1 is a diagram of an example wireless network architecture 1000. The wireless network architecture 1000 can include, but is not limited to, a service provider system 1100, a wireless, cellular, or multiple systems operator (MSO) system 1200, and a spectrum access system (SAS) 1300. The wireless network architecture 1000 can implement any wireless technology including, but not limited to, third generation (3G), fourth generation (4G), and fifth generation (5G) wireless communications and/or networks, and CBRS or shared spectrum wireless technologies and/or networks. In implementations, the wireless network architecture 1000 can be a hybrid mobile virtual network operator (HMNO) network where a service provider, which owns and operates the service provider system 1100 and can operate the MSO system 1200 as a mobile virtual network operator (MVNO). The number of components shown herein are illustrative and there may be more or less in the wireless network architecture 1000. The wireless network architecture 1000 and the components therein may include other elements which may be desirable or necessary to implement the devices, systems, and methods described herein. However, because such elements and steps do not facilitate a better understanding of the disclosed embodiments, a discussion of such elements and steps may not be provided herein.

Figure 2:
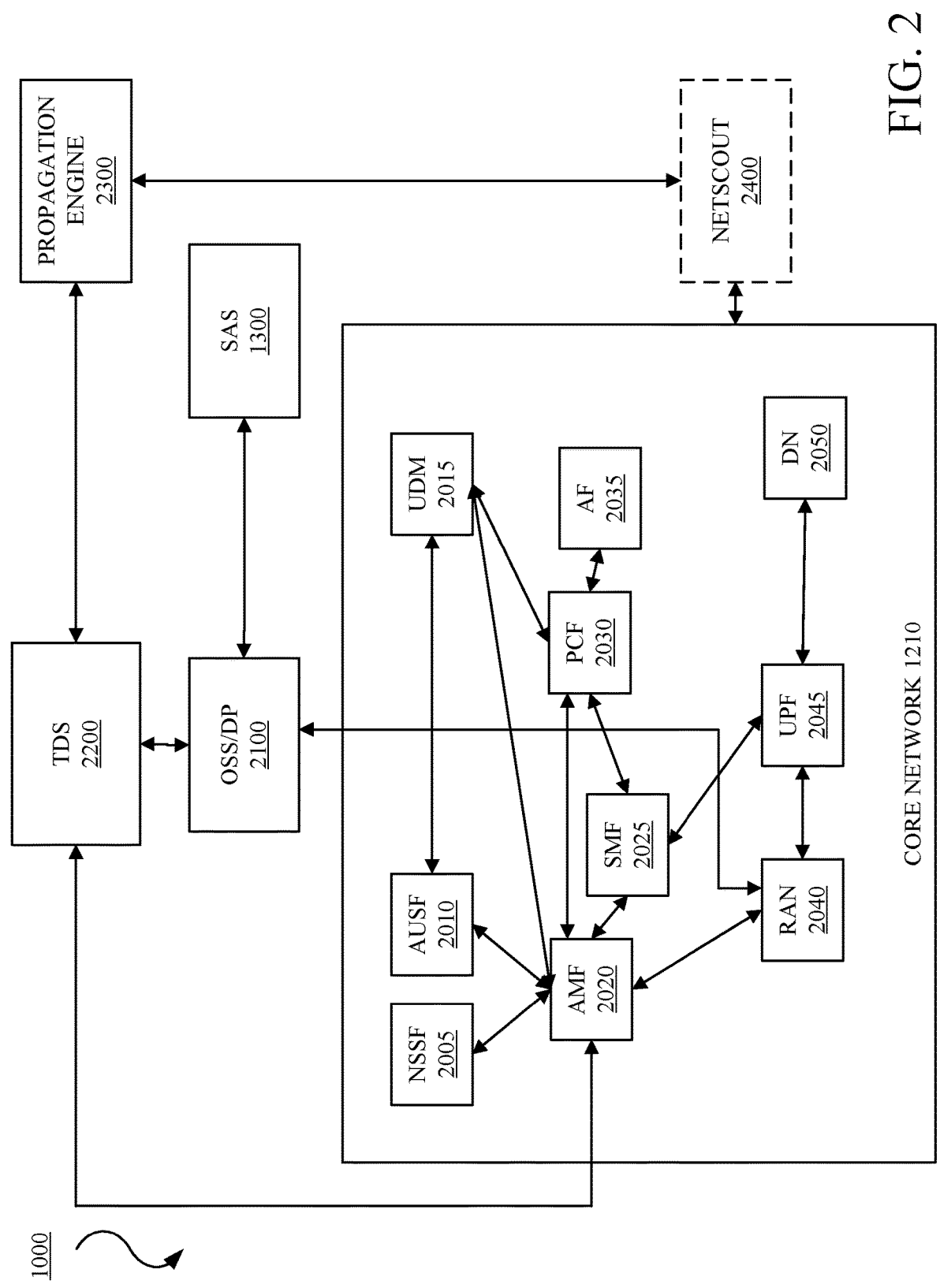
FIG. 2 is a diagram of an example of the wireless network in the wireless network architecture of FIG. 1 in accordance with embodiments of this disclosure.

Referring now also to FIG. 2, the cellular system 1200 can include various functional components to address mobility management, authentication, session management, and other related functions with respect to, for example, one or more base stations 1220, 1230, 1240, 1250, 1260, and 1270. The cellular system 1200 can include, but is not limited to, a core network 1210 and the one or more base stations 1220, 1230, 1240, 1250, 1260, and 1270. Each of the one or more base stations 1220, 1230, 1240, 1250, 1260, and 1270 can be an access point, an access node, or like device which enables radio communications access between mobile devices 1400, 1410, 1420, 1430, 1440, 1450, 1460, 1470, 1500, 1600, and other devices in respective wireless coverage areas 1222, 1232, 1242, 1252, 1262, and 1272. Each of the one or more base stations 1220, 1230, 1240, 1250, 1260, and 1270 can support wireless communications via one or more of the 3G, the 4G, the 5G, and CBRS wireless technologies and/or networks. In the instance that a base station 1220, 1230, 1240, 1250, 1260, and 1270 uses or supports the CBRS spectrum, the base station 1220, 1230, 1240, 1250, 1260, and 1270 can be, in part, a CBSD, which has been granted or authorized CBRS spectrum by the SAS 1300.

In implementations, the core network 1210 can include, but is not limited to, a Network Slice Selection Function (NSSF) 2005, an Authentication Server Function (AUSF) 2010, a Unified Data Management (UDM) 2015, an Access and Mobility management Function (AMF) 2020, a Session Management Function (SMF) 2025, a Policy Control Function (PCF) 2030, an Application Function (AF) 2035, a Radio Access Network (RAN) 2040, a User Plane Function (UPF) 2045, and a Data Network (DN) 2050. The core network 1210 can function as described in the 3rd Generation Partnership Project (3GPP) specifications, which are incorporated herein by reference as if set forth herein. In implementations, the NSSF 2005 can handle network slice functions, the AUSF 2010 can handle authentication functions, the UDM 2015 can handle security credentials, the AMF 2020 can handle control plane functions and connection and management mobility tasks, the SMF 2025 can handle calls and sessions, the PCF 2030 can handle processes to ensure that the user data traffic does not exceed the negotiated bearer(s) capacities, the AF 2035 can control application(s), the RAN 2040 can handle access, the UPF 2045 can handle the user data, and the DN 2050 can act as a user data repository.

The service provider system 1100 can include various functional components to address mobility management, authentication, session management, and other related functions with respect to, for example, the one or more base stations 1220, 1230, 1240, 1250, 1260, and 1270. The service provider system 1100 can include, but is not limited to, an operations support system (OSS) 2100, a traffic distribution system 2200, a propagation engine 2300, and may include a network management application 2400, such as Netscout, to provide real-time or substantially real-time load information about the cellular system or network 1200. In implementations, the service provider can have PAL licenses and can operate on GAA in a CBRS network. In implementations, the operations support system (OSS) 1120, the traffic distribution system 2200, the propagation engine 2300, and the network management application 2400 can be logically separate, logically integrated, physically separate, physically integrated, and/or combinations thereof.

The OSS 2100 can work with the cellular system 1200, the core network 1210, the traffic distribution system 2200, and the SAS 1400 and the other components in the service provider system 1100 to enable and/or configure a mobile device to change or transfer from a base station (supporting CBRS) that is suspended by the SAS 1300 to an alternative base station and/or cell. In implementations, the OSS 2100 can work with the cellular system 1200, the core network 1210, the traffic distribution system 2200, and the SAS 1400 and the other components in the service provider system 1100 to enable and/or configure a mobile device to change or transfer back, if appropriate, to the original base station once the base station is restored to service by the SAS 1400.

The traffic distribution system 2200 can work with the cellular system 1200, the core network 1210, the propagation engine 2300, the network management application 2400, and other components in the service provider system 1100 and the cellular system 1200 to determine alternative base stations and/or cells to which a mobile device can change or transfer to in the event of a CBSD grant suspension. In implementations, the traffic distribution system 2200 can work with various core network components, including but not limited to, the SMF 2025 and the PCF 2030 to determine the session and policy to determine the demand from the mobile device based on service level agreements.

The traffic distribution system 2200 can maintain a list of base stations. The traffic distribution system 2200 can use a propagation engine and propagation data to determine cell coverages for each base station. The cell coverages are used to determine alternative base stations, CBSDs, cells, and/or networks in the event a CBSD is suspended or out of service as a result of a CBSD grant suspension. For instance, the SAS can suspend the grant due to incumbent activity, the SAS can blacklist the CBSD, de-registration of the CBSD, an administrative reason, and/or other reasons. In implementations, the traffic distribution system 2200 can use the location of a mobile device, the location of the alternative cells, radio frequency (RF) conditions, and/or other information to select among multiple alternative cells in the event of a CBSD grant suspension. In implementations, the traffic distribution system 2200 can use load conditions with respect to the mobile device, load conditions with respect to the alternative cells, and/or combinations thereof to complement or supplement selection of the alternative cell. In implementations, the load conditions with respect to the mobile device, the load conditions with respect to the alternative cells, and/or combinations thereof can be updated and/or obtained in real-time or substantially real-time to make optimal selections. In implementations, the traffic distribution system 2200 can a standalone system, integrated with the OSS 2100, and/or combinations thereof. In implementations, the traffic distribution system 2200 can be a third party system, controlled by the service provider, and/or combinations thereof.

The propagation engine 2300 can determine a coverage area for each base station maintained by the traffic distribution system 2200. The coverage area represents the area that the base station can reach and provide service. Different propagation models can be used in combination with digital terrain, morphologies, buildings and/or morphology heights data.

The network management application 2400 can obtain and provide load information with respect to mobile devices and base stations to the traffic distribution system 2200. In implementations, the network management application 2400 can obtain the load information from the core network 1210. The load information with respect to mobile devices and base stations can be used to optimize and distribute transfer decisions among multiple base stations, cells, and/or networks, accordingly.

The SAS 1300 enables access to the CBRS spectrum and dynamically manages the spectrum for optimal use, efficiency, and compliance with CBRS rules. The SAS 1300 communicates with each base station 1220, 1230, 1240, 1250, 1260, and 1270 (which can be a CBSD or which supports CBRS) for registration, grant allocation/deallocation and interference management. The SAS 1300 can perform interference analysis based on the power measurements received from mobile device(s) and make allocation and deallocation decisions based on the interference. The SAS 1300 may be operated by a commercial, federal entity, or some combinations thereof.

The mobile devices 1400, 1410, 1420, 1430, 1440, 1450, 1460, 1470, 1500, and 1600 can be, but is not limited to, Internet of Thing (IoT) devices, sensors, end user devices, cellular telephones, Internet Protocol (IP) devices, mobile computers, laptops, handheld computers, personal media devices, smartphones, notebooks, notepads, and the like, which can be provisioned for operation with a MSO, a MVNO, and/or service provider, can be provisioned for direct communication with each other and other mobile devices, and can be provided and provisioned by a service provider to operate in 3G, 4G, 5G, CBRS, and/or other wireless communication technologies and/or networks.

Operationally, the base station 1240 supports CBRS and is performing as a CBSD. In this instance, the base station 1240 has received a grant to use CBRS spectrum from the SAS 1300. The base station 1240 has a coverage area 1242 and can provide wireless services to mobile devices 1400, 1410, 1420, 1430, 1440, 1450, 1460, and 1470. The traffic distribution system 2200 can maintain a list of base stations, for example base stations 1220, 1230, 1250, 1260, and 1270, in the wireless or cellular network 1200. The propagation engine 2300 can determine wireless coverage areas, such as coverage areas 1222, 1232, 1252, 1262, and 1272, for each base station in the list, respectively.

At some point in time, the SAS 1300 sends a suspension order or command to the service provider system 1100 and/or the OSS 2100. The suspension order or command starts a defined period of time within which the base station 1240 needs to stop transmitting on the previously granted CBRS spectrum. In response to the suspension order or command, the traffic distribution system 2200 can maintain a state of the wireless or cellular network 1200 at this time. The traffic distribution system 2200 obtains information about the one or more mobile devices being serviced by the base station 1240, the location of the one or more mobile devices being serviced by the base station 1240, the load or demand by each of the one or more mobile devices being serviced by the base station 1240, and RF conditions (collectively "determination data"). The determination data can be obtained in real-time or substantially real-time. Based on the determination data and the base station 1240, the traffic distribution system 2200 can select a set of alternative or neighbor base stations, cells, and/or network (collectively "neighbor or alternative sites") and request neighbor or alternative sites determination data. The alternative site determination data can be obtained in real-time or substantially real-time. For each mobile device in the suspended CBSD, the traffic distribution system 2200 can analyze the alternative site determination data to determine one or more alternative sites which has capacity to provide and/or support the required services and load. That is, the alternative sites can be tuned or validated based on the determination data and the alternative site determination data to optimize alternative site selection for each mobile device. This can lead to, for example, a load balanced handover. For example, an alternative site can be base station 1250, which can support mobile devices 1450 and 1470, base station 1220, which can support mobile device 1440, and base station 1260, which can support mobile device 1460. This can distribute the mobile devices among the suitable alternative sites. For each mobile device in the suspended CBSD, the traffic distribution system 2200 can provide information a selected alternative site to the core network 1210. The core network 1210 can then instruct the base station 1240 and the alternative sites to perform handover processing.

In implementations, the SAS 1300 can restore a grant or provide a new grant of CBRS spectrum to the suspended CBSD. The traffic distribution system 2200 can review the pre-suspended state of the wireless or cellular network 1200, obtain updated information including updated determination data, and determine network performance in view of a potential transfer. That is, the traffic distribution system 2200 can determine whether network performance will be degraded, remain the same, or improve by transferring the mobile device(s) back to their original base stations. For example, the traffic distribution system 2200 can determine whether the mobile device has moved relative to the base station.

Figure 3A:
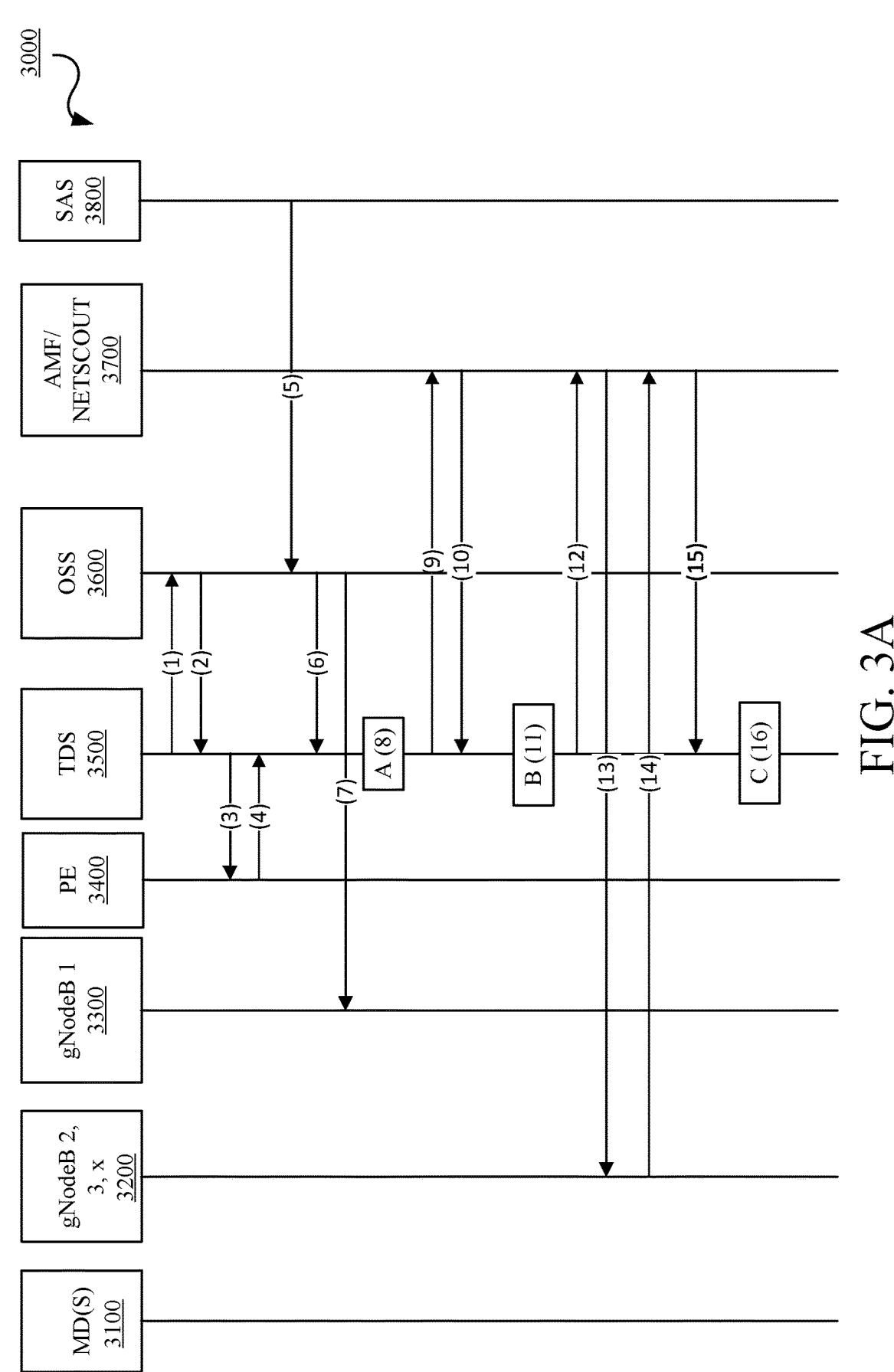
FIGS. 3A and 3B are a flow diagram of an example of a system using a preemptive handoff method and device in accordance with embodiments of this disclosure.
Figure 3B:
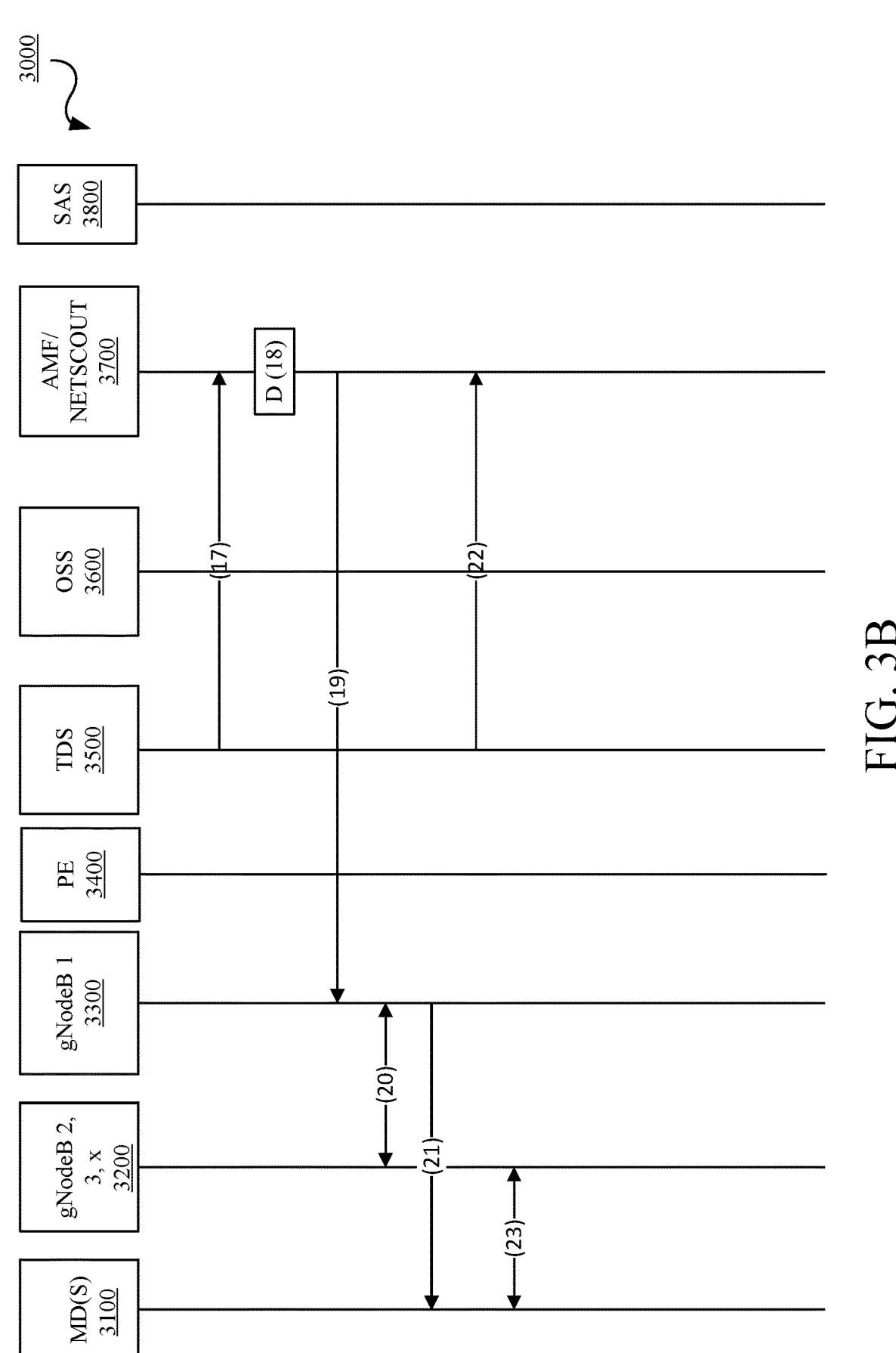

FIGS. 3A and 3B are a flow 3000 of an example of a system using a preemptive handoff method and device in accordance with embodiments of this disclosure. The flow 3000 is performed between one or more mobile devices (MD(S)) 3100, one or more base stations (gNodeB 2, 3, . . . , x) 3200, a base station (gNodeB 1) 3300, a propagation engine (PE) 3400, a traffic distribution system (TDS) 3500, an OSS 3600, an AMF/Netscout 3700, and a SAS 3800. Each of the components listed in FIGS. 3A and 3B can function as described herein with respect to FIGS. 1 and 2.

In the flow 3000, the TDS 3500 can request the OSS 3600 to send a list of sites (e.g., base stations and/or cells) in a network, site data for each site including location, power, RF environment, and/or other data, and network data including load data, traffic data, and/or other data (1). In implementations, this data can be updated on a periodic basis, on-demand, event basis, and/or combinations thereof. The OSS 3600 can send the requested data to the TDS 3500 (2). The TDS 3500 can request the PE 3400 to generate propagation profiles or wireless coverage areas for each of the sites (3). The PE 3400 can send the propagation profiles or wireless coverage areas to the TDS 3500 (4), which can maintain the sites along with the associated propagation profiles or wireless coverage areas.

In implementations, the SAS 3800 can send a grant suspension order for a base station using CBRS spectrum (e.g., a CBSD) to the OSS 3600 (5). The OSS 3600 can forward the grant suspension order to the TDS 3500 (6). The OSS 3600 can also forward the grant suspension order to the appropriate base station, i.e., the gNodeB 1 3300 (7). In response to the grant suspension order for the base station, the TDS 3500 can analyze the site data for each site including location, power, RF environment, and/or other data, the network data including load data, traffic data, and/or other data, the propagation data, the grant suspension order for the base station, and store the current state of the network (A(8)). The TDS 3500 can request the AMF/Netscout 3700 to provide the gNodeB 1 3300 location and demand and/or cell load data based on the gNodeB 1 3300 (9). The AMF/Netscout 3700 can send the requested data (10).

The TDS 3500 can analyze the gNodeB 1 3300 location (identification data or other appropriate data) and demand and/or cell load data to determine where wireless coverage area is needed and how much capacity is needed at a potential alternative sites (B(11)). The TDS 3500 can send a list of one or more neighbors and request neighbor data such as load data, capacity data, and/or other data (12). The one or more neighbors are based on the gNodeB 1 3300 and the demand and/or cell load data based on the gNodeB 1 3300. The AMF/Netscout 3700 can send the request to the appropriate neighbor sites, e.g., gNodeB 2, 3, . . . , x 3200 (13). Each of the gNodeB 2, 3, . . . , x 3200 can send the requested data to the AMF/Netscout 3700 (14). The AMF/Netscout 3700 can forward the data to the TDS 3500 (15).

The TDS 3500 can analyze the requested neighbor data to determine the available capacities at the gNodeB 2, 3, . . . , x 3200, which ones provide the required wireless coverage areas, and combinations thereof (C(16)). The TDS 3500 can send an alternative site for each mobile device currently being serviced by the suspended base station (17). The AMF at the AMF/Netscout 3700 can prepare the suspended base station and each alternative base station to transfer the MD(S) 3100 to the alternative base station (D(18)). The AMF at the AMF/Netscout 3700 can instruct the gNodeB 1 3300 to transfer the MD(S) 3100 to the alternative base station (19). The gNodeB 1 3300 and the gNodeB 2, 3, . . . , x 3200 can exchange handover instructions (20). The gNodeB 1 3300 can send a handover command to the MD(S) 3100 (21). The MD(S) 3100 and the gNodeB 2, 3, . . . , x 3200 can establish a new communication link (23).

Figure 4:
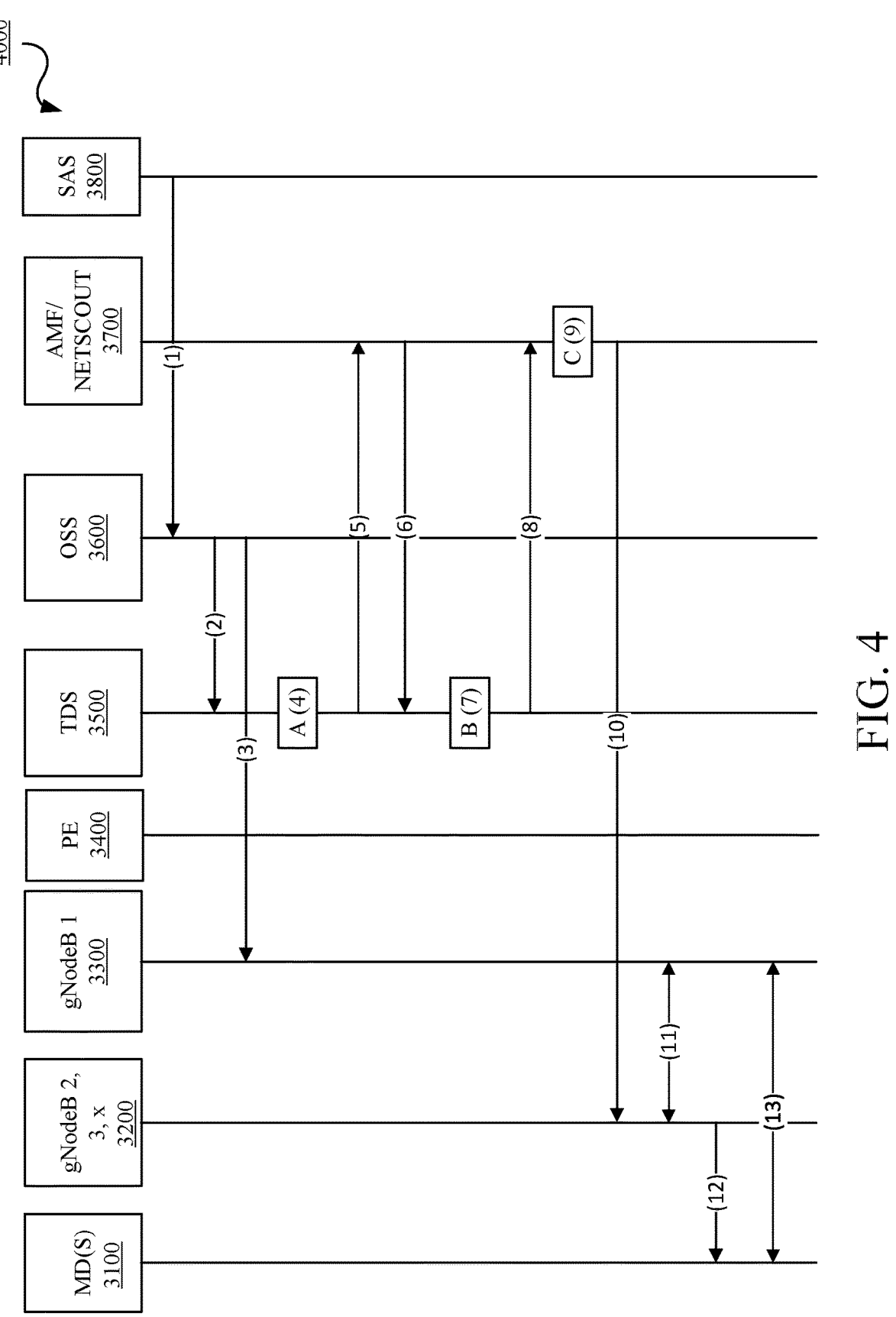
FIG. 4 is a flow diagram of an example of a system using a preemptive handoff method and device in accordance with embodiments of this disclosure.

FIG. 4 is a flow 4000 of an example of a system using a preemptive handoff method and device in accordance with embodiments of this disclosure. The flow 4000 is performed between one or more mobile devices (MD(S)) 3100, one or more base stations (gNodeB 2, 3, . . . , x) 3200, a base station (gNodeB 1) 3300, a propagation engine (PE) 3400, a traffic distribution system (TDS) 3500, an OSS 3600, an AMF/Netscout 3700, and a SAS 3800. Each of the components listed in FIG. 4 can function as described herein with respect to FIGS. 1, 2, and 3A-3B.

In the flow 4000, the SAS 3800 restores a grant of CBRS spectrum to the gNodeB 1 3300 (1). The OSS 3600 can forward the grant to the TDS 3500 (2) and to the gNodeB 1 3300 (3). The TDS 3500 can analyze whether to transfer the MD(S) 3100 to the gNodeB 1 3300 using the stored pre-suspension state of the network (A(4)). The TDS 3500 can determine whether the network performance degrades, stays the same, or increases based on a transfer back. The TDS 3500 can request MD(S) 3100 data (this is updated data) (5). This can include location data, loading data, traffic data, and the like. For example, the data may show new mobile devices in the restored gNodeB 1 3300 and that the MD(S) 3100 have moved. The AMF 3700 can provide the requested data to the TDF 3500 (6). The TDS 3500 can analyze the data and prepare transfer instructions, as appropriate (8).

The AMF 3700 can prepare the gNodeB 1 3300 and the gNodeB 2, 3, . . . , x 3200 for transfer of the MD(S) 3100 back to the gNodeB 1 3300 (C (9)). The AMF 3700 can send instructions to the gNodeB 2, 3, . . . , x 3200 to transfer the MD(S) 3100 back to the gNodeB 1 3300 (10). The gNodeB 1 3300 and the gNodeB 2, 3, . . . , x 3200 can exchange handover instructions (11). The gNodeB 2, 3, . . . , x 3200 can send a handover command to the MD(S) 3100 (12). The MD(S) 3100 and the gNodeB 1 3300 can establish a new communication link (13).

Figure 5:
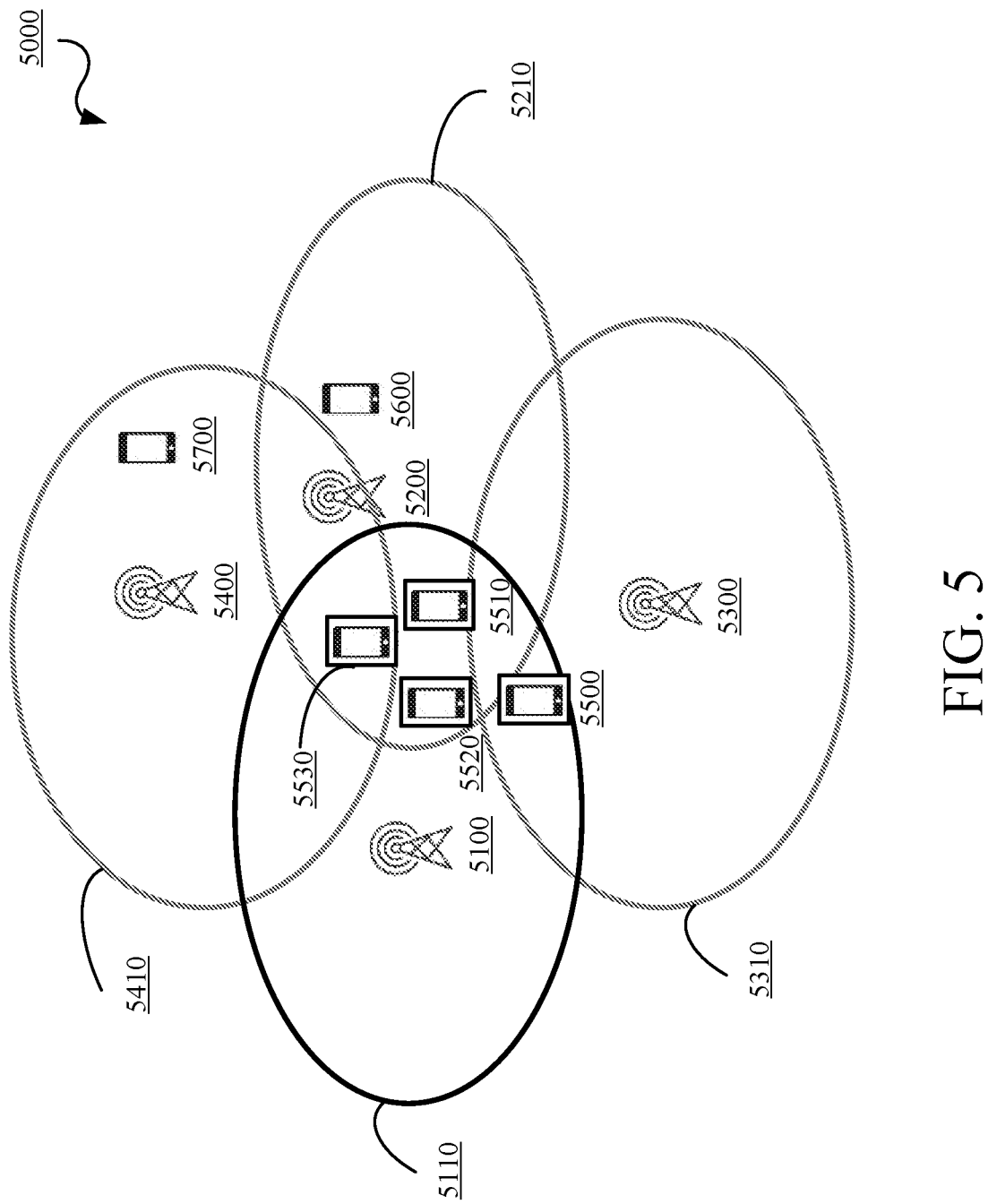
FIG. 5 is a diagram of an example preemptive handoff in accordance with embodiments of this disclosure.

FIG. 5 is a diagram of an example preemptive handoff scenario 5000 in accordance with embodiments of this disclosure. The components described with respect to FIGS. 1-4 can be used to perform the analysis and handover described with respect to FIG. 5 and are not repeated here. The preemptive handoff scenario 5000 includes base stations 5100, 5200, 5300, and 5400, which can be an access point, an access node, or like device which enables radio communications access between mobile devices 5500, 5510, 5520, 5530, 5600, 5700, and other devices in respective wireless coverage areas 5110, 5210, 5310, and 5410. Each of the one or more base stations 5100, 5200, 5300, and 5400 can support wireless communications via one or more of the 3G, the 4G, the 5G, and CBRS wireless technologies and/or networks. In the instance that a base station 5100, 5200, 5300, and 5400 uses or supports the CBRS spectrum, the base station 5100, 5200, 5300, and 5400 can be, in part, a CBSD, which has been granted or authorized CBRS spectrum by a SAS.

In the preemptive handoff scenario 5000, the base station 5100 has a CBRS spectrum grant and is able to provide services to the mobile devices 5500, 5510, 5520, and 5530. The SAS may then send a grant suspension has described herein. The propagation engine, the traffic distribution system, the OSS, the core network, the AMF, and the Netscout, when appropriate, can perform as described herein. The TDS can determine in this instance whether the base station 5200 is able to take on all the mobile devices 5500, 5510, 5520, and 5530 or whether the mobile device 5530 should transfer to base station 5400 and whether the mobile device 5500 should transfer to the base station 5300 for optimal distribution based on coverage, capacity, load, network performance, and/or combinations thereof.

Figure 6:
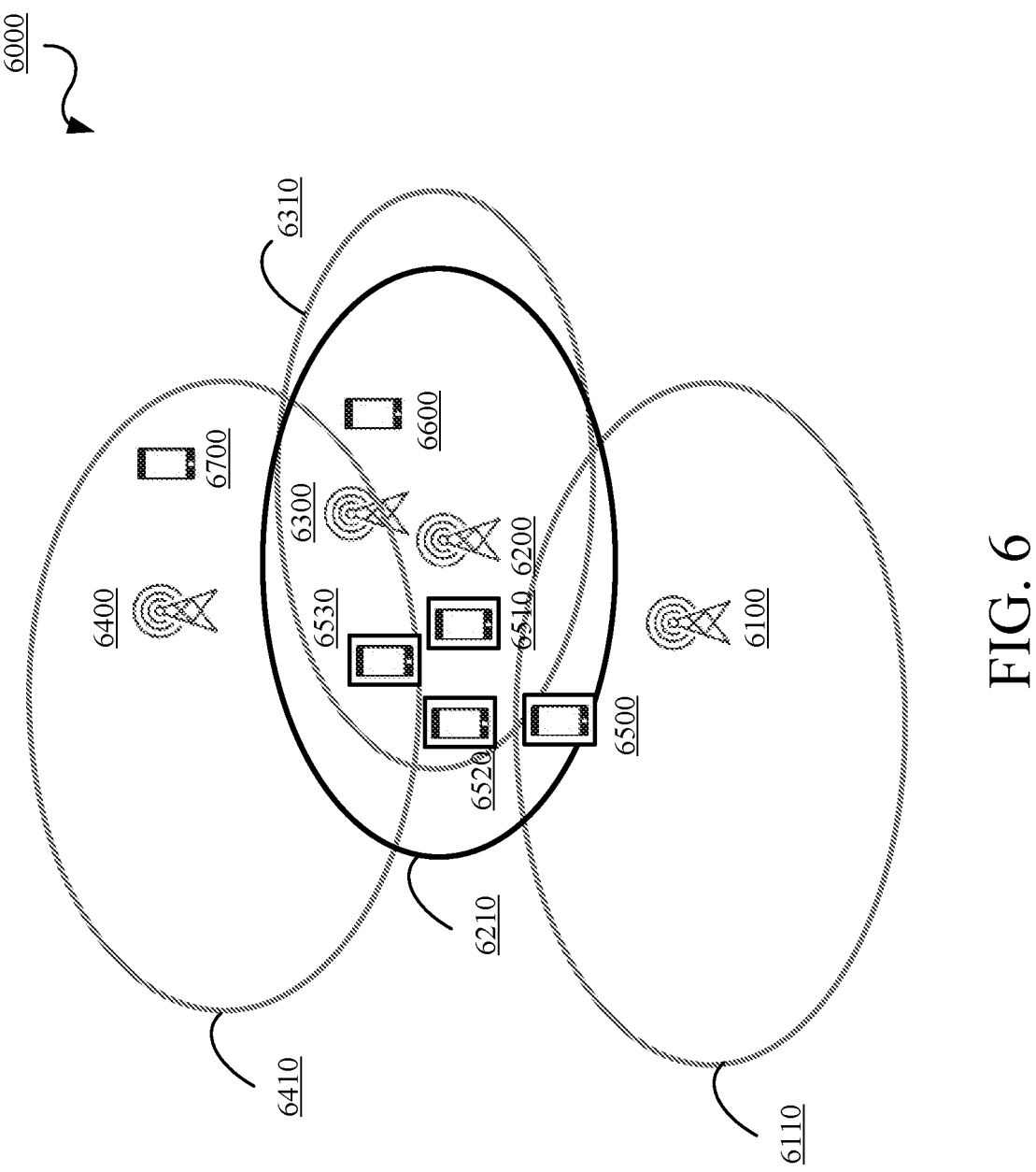
FIG. 6 is a diagram of an example preemptive handoff in accordance with embodiments of this disclosure.

FIG. 6 is a diagram of an example preemptive handoff scenario 6000 in accordance with embodiments of this disclosure. The components described with respect to FIGS. 1-4 can be used to perform the analysis and handover described with respect to FIG. 6 and are not repeated here. The preemptive handoff scenario 6000 includes base stations 6100, 6200, 6300, and 6400, which can be an access point, an access node, or like device which enables radio communications access between mobile devices 6500, 6510, 6520, 6530, 6600, 6700, and other devices in respective wireless coverage areas 6110, 6210, 6310, and 6410. Each of the one or more base stations 6100, 6200, 6300, and 6400 can support wireless communications via one or more of the 3G, the 4G, the 5G, and CBRS wireless technologies and/or networks. In the instance that a base station 6100, 6200, 6300, and 6400 uses or supports the CBRS spectrum, the base station 6100, 6200, 6300, and 6400 can be, in part, a CBSD, which has been granted or authorized CBRS spectrum by a SAS.

In the preemptive handoff scenario 6000, the base station 6200 has a CBRS spectrum grant and is able to provide services to the mobile devices 6500, 6510, 6520, and 6530. In this instance, the base station 6200 can be a capacity cell that is using CBRS GAA spectrum. The SAS may then send a grant suspension has described herein to stop transmitting on the GAA. In some instances, the base station 6200 may be able to transfer the mobile devices 6500, 6510, 6520, and 6530 to CBRS PAL spectrum. In the instant case, this is not possible.

Accordingly, the propagation engine, the traffic distribution system, the OSS, the core network, the AMF, and the Netscout, when appropriate, can perform as described herein. The TDS can determine in this instance whether the base station 6300 is able to take on all the mobile devices 6500, 6510, 6520, and 6530 or whether the mobile device 6500 should transfer to base station 6100 and whether the mobile device 6530 should transfer to the base station 6400 for optimal distribution based on coverage, capacity, load, network performance, and/or combinations thereof. In implementations, each of the base stations can be operating on CBRS PAL spectrum.

Figure 7:
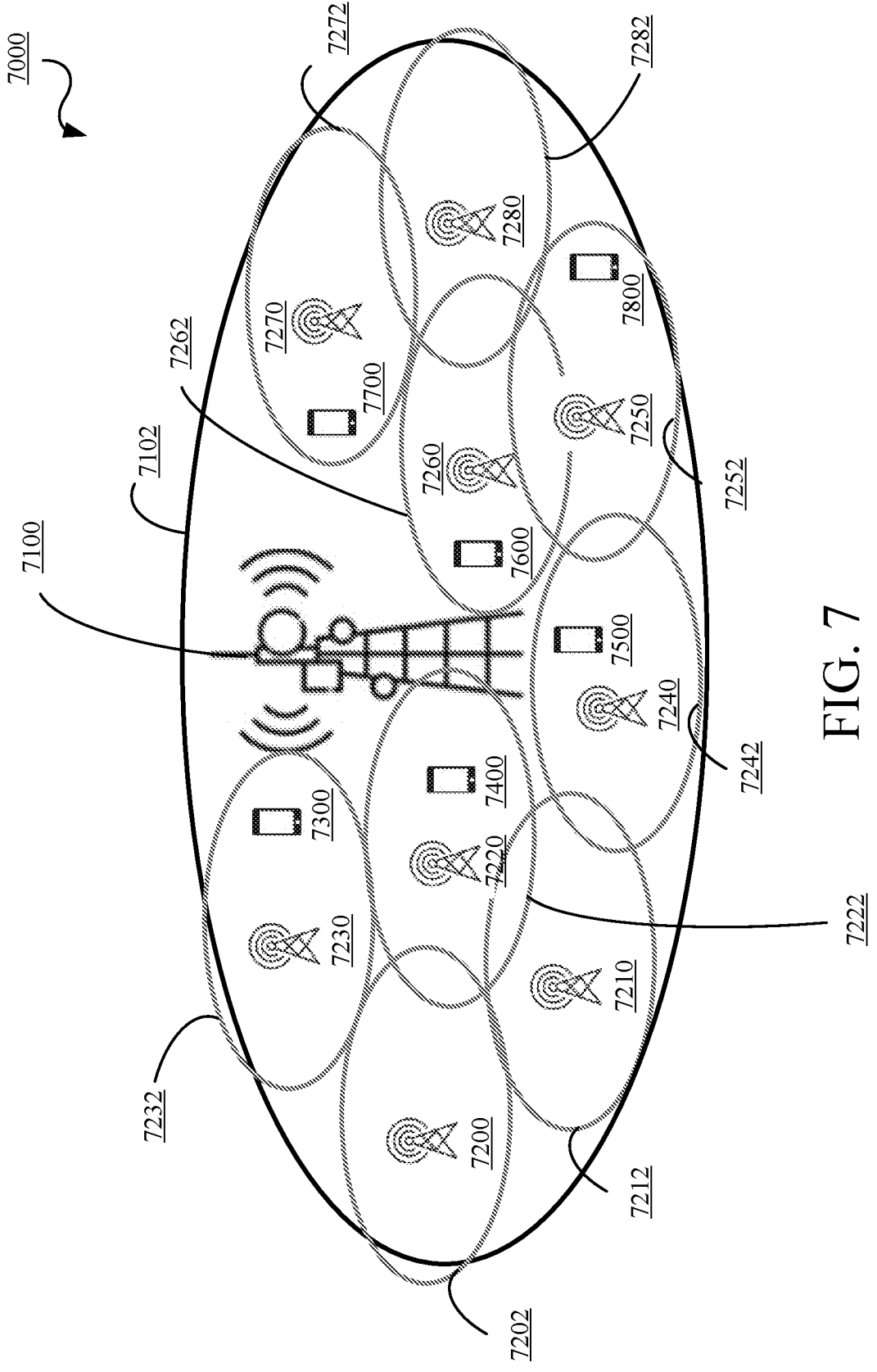
FIG. 7 is a diagram of an example preemptive handoff in accordance with embodiments of this disclosure.

FIG. 7 is a diagram of an example preemptive handoff scenario 7000 in accordance with embodiments of this disclosure. The components described with respect to FIGS. 1-4 can be used to perform the analysis and handover described with respect to FIG. 7 and are not repeated here. The preemptive handoff scenario 7000 includes base stations 7100, 7200, 7210, 7220, 7230, 7240, 7250, 7260, 7270, and 7280, which can be an access point, an access node, or like device which enables radio communications access between mobile devices 7300, 7400, 7500, 7600, 7700, 7800, and other devices in respective wireless coverage areas 7102, 7202, 7212, 7222, 7232, 7242, 7252, 7262, 7272, and 7282. Each of the one or more base stations 7100, 7200, 7210, 7220, 7230, 7240, 7250, 7260, 7270, and 7280 can support wireless communications via one or more of the 3G, the 4G, the 5G, and CBRS wireless technologies and/or networks. In the instance that a base station 7100, 7200, 7210, 7220, 7230, 7240, 7250, 7260, 7270, and 7280 uses or supports the CBRS spectrum, the base station 7100, 7200, 7210, 7220, 7230, 7240, 7250, 7260, 7270, and 7280 can be, in part, a CBSD, which has been granted or authorized CBRS spectrum by a SAS.

In the preemptive handoff scenario 7000, the base station 7100 has a CBRS spectrum grant and is able to provide services to the mobile devices 7300, 7400, 7500, 7600, 7700, and 7800. In this instance, the base station 7100 can be a capacity cell and/or a high-power, umbrella cell. In implementations, the base station 7100 is using CBRS GAA spectrum. The SAS may then send a grant suspension has described herein to stop transmitting. Accordingly, the propagation engine, the traffic distribution system, the OSS, the core network, the AMF, and the Netscout, when appropriate, can perform as described herein. The TDS can determine in this instance which of the base stations 7200, 7210, 7220, 7230, 7240, 7250, 7260, 7270, and 7280 can provide the required coverage, can handle the mobile device load, and has capacity to do so. In this instance, the base stations 7220, 7230, 7240, 7250, 7260, and 7270 can provide services to mobile devices 7400, 7300, 7500, 7800, 7600, and 7700, respectively.

Figure 8:
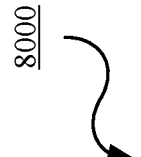
FIG. 8 is a block diagram of an example of a device in accordance with embodiments of this disclosure.
Figure 8:
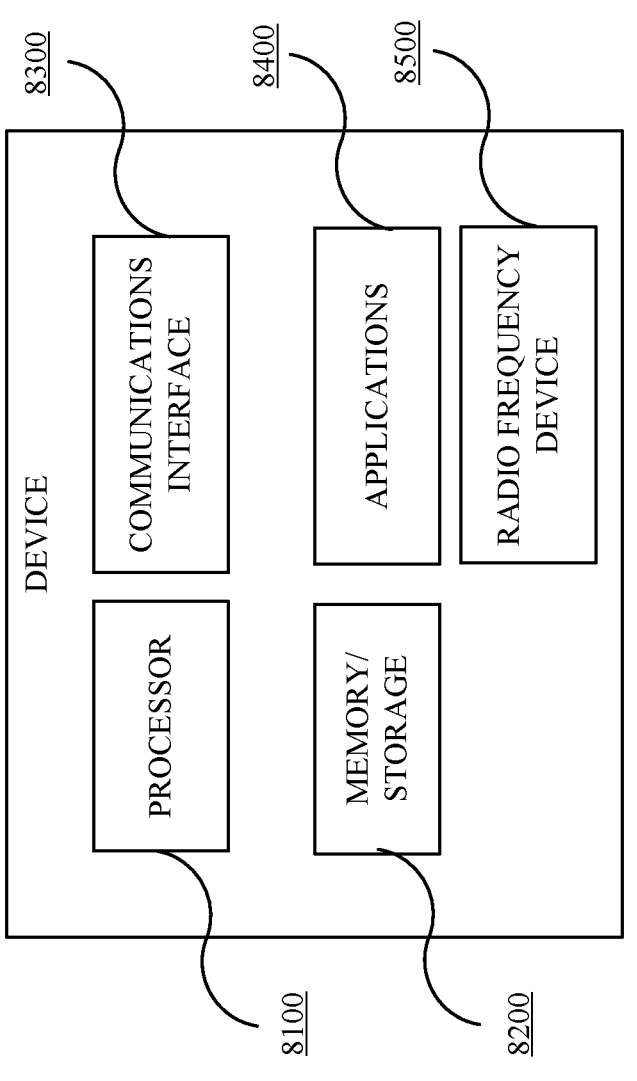

FIG. 8 is a block diagram of an example of a device 8000 in accordance with embodiments of this disclosure. The device 8000 may include, but is not limited to, a processor 8100, a memory/storage 8200, a communication interface 8300, applications 8400, and, if needed, a radio frequency device 8500. The device 8000 may include or implement, for example, the components described with respect to FIGS. 1-7. The applicable or appropriate flows, techniques, or methods described herein may be stored in the memory/storage 8200 and executed by the processor 8100 in cooperation with the memory/storage 8200, the communications interface 8300, the applications 8400, and the radio frequency device 8500 (when applicable), as appropriate. The device 8000 may include other elements which may be desirable or necessary to implement the devices, systems, and methods described herein. However, because such elements and steps do not facilitate a better understanding of the disclosed embodiments, a discussion of such elements and steps may not be provided herein.

FIG. 9 is a flowchart of an example method 9000 for preemptive handoff in response to receiving a grant suspension at a Citizens Broadband Radio Service (CBRS) device (CBSD) in a CBRS network in accordance with embodiments of this disclosure. The method 9000 includes: receiving 9100 a CBRS spectrum suspension command for a base station; determining 9200 an alternative base station for a mobile device being serviced by the base station; and sending 9300 the alternative base station for the mobile device being serviced by the base station to a core network to send a handover command to the base station to initiate a transfer to the alternative base station for the mobile device. The method 9000 can be implemented, for example, in or by components described with respect to FIGS. 1-8 and in conjunction with any of the flows described with respect to FIGS. 1-8. as appropriate and applicable.

The method includes receiving 9100 a CBRS spectrum suspension command for a base station. A base station in a wireless network can operate on or with a variety of wireless technologies including, but not limited to, 3G, 4G, 5G, and CBRS or shared spectrum wireless technologies and/or networks. The base station needs a grant from a SAS or similar shared spectrum management system to use or operate on the CBRS or shared spectrum. Once the grant is received, the base station may service mobile devices configured to operate on the CBRS or shared spectrum. In some instances, the mobile devices are configured to operate on 3G, 4G, 5G, and CBRS or shared spectrum wireless technologies and/or networks using multiple radios, multiple transceivers, multiple Subscriber Identity Module or Subscriber Identification Module (SIM) modules or cards, and/or combinations thereof. Under certain circumstances, the service provider system, namely the OSS, receives a grant suspension order or command from the SAS and sends the grant suspension order or command to a traffic distribution system and the base station. The base station has to stop transmitting on the CBRS or shared spectrum in accordance with the grant suspension order within a defined period of time.

The method includes determining 9200 an alternative base station for a mobile device being serviced by the base station. A traffic distribution system at a service provider system or associated with the service provider system maintains a list of base stations operating in the wireless network. For each base station, the traffic distribution system, in cooperation with a propagation engine, also maintains a wireless coverage area for each of the base stations. In response to the grant suspension order or command, the traffic distribution system stores a state of the wireless network and sends a request to a core network for a list of one or more mobile devices using the suspended base station, the location of the one or more mobile devices using the suspended base station, and a load or demand being placed on the suspended base station by each of the one or more mobile devices using the suspended base station. The traffic distribution system analyzes the data in terms of coverage loss and capacity loss, the location of the suspended base station, and determines or selects a list of neighbor cells from the maintained list of base stations. That is, the traffic distribution system also reviews data for the suspended base station with respect to location and wireless coverage area. A request is sent to obtain data about the neighbor cells with respect to load, capacity, number of mobile devices being serviced, power, and other pertinent data. The traffic distribution system analyzes the neighbor data along with the base station and mobile device data to determine an alternative base station for the mobile device. In implementations, the traffic distribution system can determine alternative base stations for most, substantially all, or all mobile devices using the suspended base station. In implementations, the alternative base station can be used for multiple mobile devices being serviced by the suspended base station. In implementations, the alternative base station can operate in, but not limited to, one or more of the 3G, 4G, 5G, and CBRS or shared spectrum wireless technologies and/or networks.

The method includes sending 9300 the alternative base station for the mobile device being serviced by the base station to a core network to send a handover command to the base station to initiate a transfer to the alternative base station for the mobile device. The core network prepares the suspended base station and the alternative base stations for the upcoming handover and transfer. The core network sends a handover command to the suspended base station, which in turn sends the handover command to the alternative base station and the mobile device to establish a link between the alternative base station and the mobile device. In implementations, the link between the alternative base station and the mobile device is completed by or prior to the end of the defined period of time. In implementations, the link between the alternative base station and the mobile device is completed prior to the mobile device having to undergo a random access procedure to attach to the wireless network and/or to a base station (which is not the suspended base station) . . . . In implementations, the link between the alternative base station and the mobile device is completed before the mobile device experiences a loss or interruption of service.

Described herein are methods for preemptive handoff in response to receiving a grant suspension at a Citizens Broadband Radio Service (CBRS) device (CBSD). In implementations, a method for preemptive handoff in a wireless network using CBRS spectrum, the method includes maintaining, by a traffic distribution system, a list of base stations, wherein each base station has a wireless coverage area, receiving, by an operations support system, a CBRS spectrum grant suspension command for a base station, and in response to the CBRS spectrum grant suspension command, requesting, by the traffic distribution system from a core network, data for a mobile device being serviced by a suspended base station, requesting, by the traffic distribution system from a core network, data for one or more neighbor base stations, wherein the one or more neighbor base stations are selected from the list of base stations based on the suspended base station and the data received for the mobile device, determining, by the traffic distribution system, an alternative base station for the mobile device, wherein the alternative base station is selected from the one or more neighbor base stations based on the data received for the mobile device and the data received for the one or more neighbor base stations, and sending, by the traffic distribution system to the core network, the alternative base station to initiate a handover command for the mobile device from the suspended base station to the alternative base station.

In implementations, the data for the mobile device includes a location of the mobile device and a load associated with the mobile device. In implementations, the data for the one or more neighbor base stations includes capacity and load data and the determining includes optimizing, by the traffic distribution system, the load associated with the mobile device with the capacity and the load data of each of the one or more neighbor base stations to determine the alternative base station. In implementations, the maintaining further includes obtaining, by the traffic distribution system from the operations support system, the list of base stations in the wireless network, and determining, by a propagation engine, the wireless coverage area for each base station using propagation data. In implementations, the data for the mobile device includes a location of the mobile device and a load associated with the mobile device, the data for the one or more neighbor base stations includes capacity and load data, and a first occurrence of requesting and a second occurrence of requesting is performed in real-time. In implementations, the mobile device includes multiple mobile devices and wherein at least some of the multiple mobile devices are handed over to the alternative base station. In implementations, other the mobile devices of the multiple mobile devices are handed over to another alternative base station to balance load and capacity distribution. In implementations, the method further includes, in response to the CBRS spectrum grant suspension command, storing, by the traffic distribution system, a state of the wireless network. In implementations, the method further includes, in response to restoration of the suspended base station, obtaining, by the traffic distribution system from the core network, updated data for the mobile device, reviewing, by the traffic distribution system, the updated data and the stored state of the wireless network, and sending, by the traffic distribution system to the core network, transfer instructions when a transfer from the alternative base station to a restored base station improves performance of the wireless network.

Described herein are systems for preemptive handoff in response to receiving a grant suspension at a Citizens Broadband Radio Service (CBRS) device (CBSD). In implementations, a system includes an operations support system configured to receive a shared spectrum suspension for a Citizens Broadband Radio Service (CBRS) device (CBSD) from a spectrum access system, and a traffic distribution system. The traffic distribution system configured to store a list of base stations, each with an associated wireless coverage area, analyze data received for a mobile device being serviced by a suspended CBSD and data received for one or more neighbor base stations to determine an alternative base station for the mobile device, wherein the one or more neighbor base stations are selected from the list of base stations based on the suspended CBSD and the data received for the mobile device, and transmit, to a core network, the alternative base station to initiate a transfer of the mobile device from the suspended CBSD to the alternative base station prior to the mobile device losing service from the suspended CBSD.

In implementations, the data for the mobile device includes a location of the mobile device and a load associated with the mobile device, and the data for the one or more neighbor base stations includes capacity and load data, the traffic distribution system further configured to optimize the load associated with the mobile device with the capacity and the load data of each of the one or more neighbor base stations to determine the alternative base station. In implementations, the system of claim 10, further includes a propagation engine configured to determine the wireless coverage area for each base station. In implementations, the data for the mobile device includes a location of the mobile device and a load associated with the mobile device and is obtained in real-time, and the data for the one or more neighbor base stations includes capacity and load data and is obtained in real-time. In implementations, the mobile device includes multiple mobile devices and wherein at least some of the multiple mobile devices are handed over to the alternative base station. In implementations, other mobile devices of the multiple mobile devices are transferred to another alternative base station to balance load and capacity distribution. In implementations, the traffic distribution system further configured to store a state of a wireless network in response to the shared spectrum suspension. In implementations, the traffic distribution system further configured to, in response to restoration of the suspended CBSD, receive updated data for the mobile device, and analyze the updated data and a stored state of the wireless network to determine whether wireless network performance is improved based on a transfer of the mobile device back to a restored CBSD.

Described herein are methods for preemptive handoff in response to receiving a grant suspension at a Citizens Broadband Radio Service (CBRS) device (CBSD). In implementations, a method for preemptive handoff in a wireless network using Citizens Broadband Radio Service (CBRS) spectrum includes storing, by a traffic distribution system, a list of base stations, each with an associated wireless coverage area, receiving, by a service provider system from a spectrum access system, a shared spectrum suspension for a Citizens Broadband Radio Service (CBRS) device (CBSD), analyzing, by the traffic distribution system, data received for a mobile device being serviced by a suspended CBSD and data received for one or more neighbor base stations to determine an alternative base station for the mobile device, wherein the one or more neighbor base stations are selected from the list of base stations based on the suspended CBSD and the data received for the mobile device, and transmitting, to a core network, the alternative base station to initiate a transfer of the mobile device from the suspended CBSD to the alternative base station prior to the mobile device losing service from the suspended CBSD.

In implementations, the data for the mobile device includes a location of the mobile device and a load associated with the mobile device, and the data for the one or more neighbor base stations includes capacity and load data, the analyzing further includes optimizing the load associated with the mobile device with the capacity and the load data of each of the one or more neighbor base stations to determine the alternative base station. In implementations, in response to restoration of the suspended CBSD, the method further includes receiving updated data for the mobile device, and analyzing the updated data and a stored state of the wireless network to determine whether wireless network performance is improved based on a transfer of the mobile device back to a restored CBSD.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for preemptive handoff in a wireless network using Citizens Broadband Radio Service (CBRS) spectrum, the method comprising:

maintaining, by a traffic distribution system, a list of base stations, wherein each base station has a wireless coverage area;

receiving, by the traffic distribution system, a CBRS spectrum grant suspension command for a base station;

in response to the CBRS spectrum grant suspension command:

requesting, by the traffic distribution system from a core network, data for a mobile device being serviced by a suspended base station;

requesting, by the traffic distribution system from a core network, data for one or more neighbor base stations, wherein the one or more neighbor base stations are selected from the list of base stations based on the suspended base station and the data received for the mobile device;

determining, by the traffic distribution system, an alternative base station for the mobile device, wherein the alternative base station is selected from the one or more neighbor base stations based on the data received for the mobile device and the data received for the one or more neighbor base stations; and sending, by the traffic distribution system to the core network, the alternative base station to initiate a handover command for the mobile device from the suspended base station to the alternative base station.

2. The method of claim 1, wherein the data for the mobile device includes a location of the mobile device and a load associated with the mobile device.

3. The method of claim 2, wherein the data for the one or more neighbor base stations includes capacity and load data and the determining comprises:

optimizing, by the traffic distribution system, the load associated with the mobile device with the capacity and the load data of each of the one or more neighbor base stations to determine the alternative base station.

4. The method of claim 1, wherein the maintaining further comprises:

obtaining, by the traffic distribution system from an operations support system, the list of base stations in the wireless network, and determining, by a propagation engine, the wireless coverage area for each base station using propagation data.

5. The method of claim 1, wherein the data for the mobile device includes a location of the mobile device and a load associated with the mobile device, the data for the one or more neighbor base stations includes capacity and load data, and a first occurrence of requesting and a second occurrence of requesting is performed in real-time.

6. The method of claim 1, wherein the mobile device includes multiple mobile devices and wherein at least some of the multiple mobile devices are handed over to the alternative base station.

7. The method of claim 6, wherein other the mobile devices of the multiple mobile devices are handed over to another alternative base station to balance load and capacity distribution.

8. The method of claim 1, further comprising:

in response to the CBRS spectrum grant suspension command:

storing, by the traffic distribution system, a state of the wireless network.

9. The method of claim 8, further comprising:

in response to restoration of the suspended base station:

obtaining, by the traffic distribution system from the core network, updated data for the mobile device;

reviewing, by the traffic distribution system, the updated data and the stored state of the wireless network; and sending, by the traffic distribution system to the core network, transfer instructions when a transfer from the alternative base station to a restored base station improves performance of the wireless network.

10. A system, comprising:

a traffic distribution system configured to:

store a list of base stations, each with an associated wireless coverage area;

receive a shared spectrum suspension for a Citizens Broadband Radio Service (CBRS) device (CBSD);

analyze data received for a mobile device being serviced by a suspended CBSD and data received for one or more neighbor base stations to determine an alternative base station for the mobile device, wherein the one or more neighbor base stations are selected from the list of base stations based on the suspended CBSD and the data received for the mobile device; and transmit, to a core network, the alternative base station to initiate a transfer of the mobile device from the suspended CBSD to the alternative base station prior to the mobile device losing service from the suspended CBSD.

11. The system of claim 10, wherein the data for the mobile device includes a location of the mobile device and a load associated with the mobile device, and the data for the one or more neighbor base stations includes capacity and load data, the traffic distribution system further configured to:

optimize the load associated with the mobile device with the capacity and the load data of each of the one or more neighbor base stations to determine the alternative base station.

12. The system of claim 10, further comprising:

a propagation engine configured to determine the wireless coverage area for each base station.

13. The system of claim 10, wherein the data for the mobile device includes a location of the mobile device and a load associated with the mobile device and is obtained in real-time, and the data for the one or more neighbor base stations includes capacity and load data and is obtained in real-time.

14. The system of claim 10, wherein the mobile device includes multiple mobile devices and wherein at least some of the multiple mobile devices are handed over to the alternative base station.

15. The system of claim 14, wherein other the mobile devices of the multiple mobile devices are transferred to another alternative base station to balance load and capacity distribution.

16. The system of claim 10, the traffic distribution system further configured to:

store a state of a wireless network in response to the shared spectrum suspension.

17. The system of claim 16, the traffic distribution system further configured to:

in response to restoration of the suspended CBSD:

receive updated data for the mobile device; and analyze the updated data and a stored state of the wireless network to determine whether wireless network performance is improved based on a transfer of the mobile device back to a restored CBSD.

18. A method for preemptive handoff in a wireless network using Citizens Broadband Radio Service (CBRS) spectrum, the method comprising:

storing, by a traffic distribution system, a list of base stations, each with an associated wireless coverage area;

receiving, by the traffic distribution system, a shared spectrum suspension for a Citizens Broadband Radio Service (CBRS) device (CBSD);

analyzing, by the traffic distribution system, data received for a mobile device being serviced by a suspended CBSD and data received for one or more neighbor base stations to determine an alternative base station for the mobile device, wherein the one or more neighbor base stations are selected from the list of base stations based on the suspended CBSD and the data received for the mobile device; and transmitting, to a core network, the alternative base station to initiate a transfer of the mobile device from the suspended CBSD to the alternative base station prior to the mobile device losing service from the suspended CBSD.

19. The method of claim 18, wherein the data for the mobile device includes a location of the mobile device and a load associated with the mobile device, and the data for the one or more neighbor base stations includes capacity and load data, the analyzing further comprising:

optimizing the load associated with the mobile device with the capacity and the load data of each of the one or more neighbor base stations to determine the alternative base station.

20. The method of claim 18, in response to restoration of the suspended CBSD, the method further comprising:

receiving updated data for the mobile device; and analyzing the updated data and a stored state of the wireless network to determine whether wireless network performance is improved based on a transfer of the mobile device back to a restored CBSD.

* * * * *